UNITED STATES PATENT OFFICE.

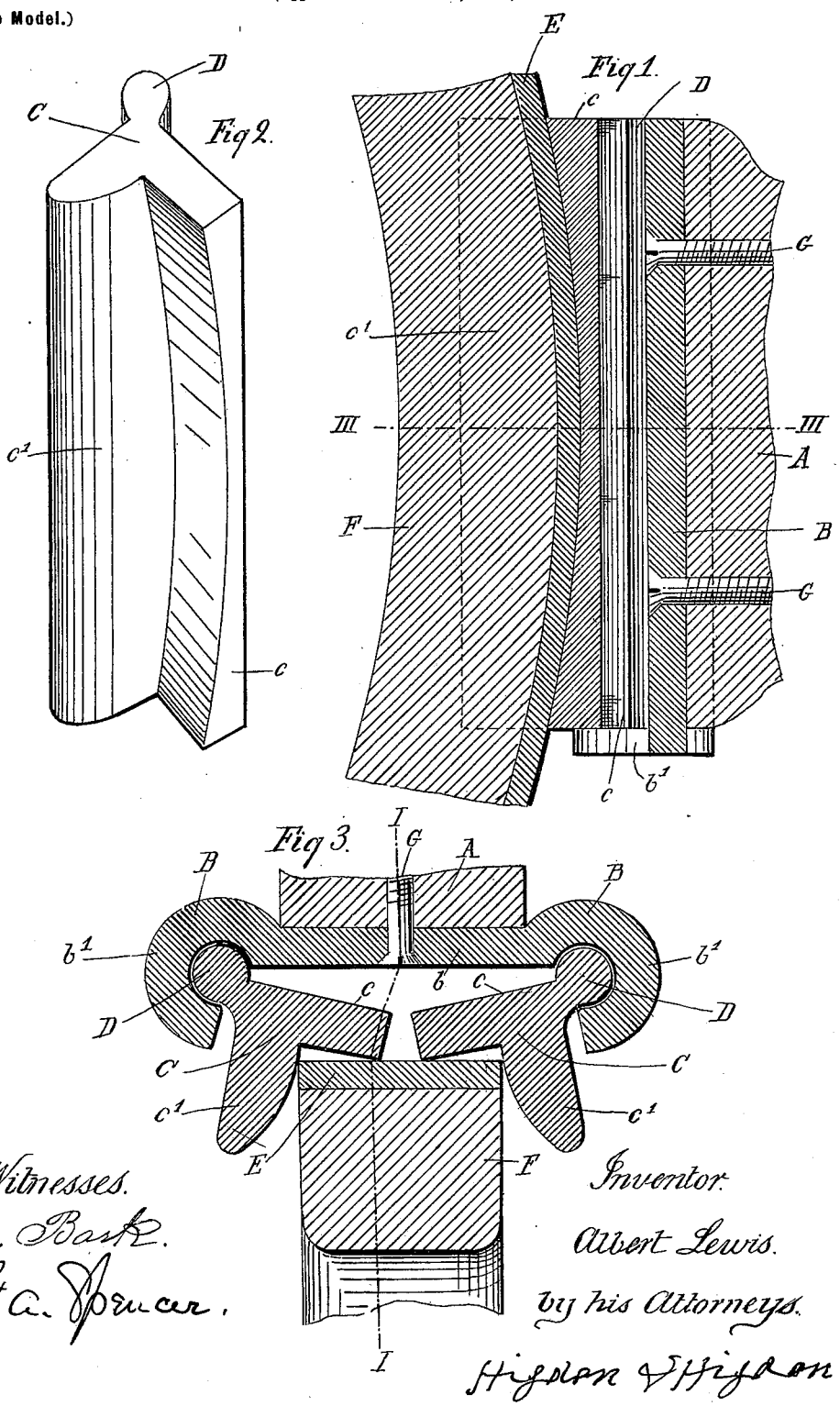

ALBERT LEWIS, OF KANSAS CITY, MISSOURI.

AUTOMATIC BRAKE-SHOE.

SPECIFICATION forming part of Letters Patent No. 650,688, dated May 29, 1900.

Application filed November 27, 1899. Serial No. 738,288. (No model.)

*To all whom it may concern:*

Be it known that I, ALBERT LEWIS, a citizen of the United States, residing at Kansas City, in the State of Missouri, have invented certain new and useful Improvements in Automatic Brake-Shoes, of which the following is a specification.

My invention relates to brakes adapted to be brought into frictional contact with the tire of a wagon-wheel to check or stop its revolution, and particularly to doubly-winged partially-rotatable clamps secured on the brake-block on each side of the wheel in such positions that forcible contact with the peripheral surface of the tire will close the outer wings of the clamps against the edges of the tire, thus bringing pressure upon the tire from three directions and securing more efficient action than that afforded by the brakes in common use.

In the drawings, Figure 1 is a vertical section on the irregular dotted line I I of Fig. 3 looking to the left. Fig. 2 is a perspective view of one of the clamps detached. Fig. 3 is a cross-section of the entire device on the line III III of Fig. 1.

A designates the brake-block; B, the clamp-holder; C, the clamps; D, the partially-cylindrical shoulders on said clamps; E, the tire, and F the felly.

The brake-block A may be operatively connected to a brake beam, lever, or rod in any preferred manner.

The clamp-holder B consists, preferably, of a piece of cast-steel or malleable iron, having a flat central portion $b$, to be secured to the inner surface of block A, to which it is attached by screws or bolts G. The extensions $b'$ on each of the lateral margins of said clamp-holders are curved outwardly and afterward inwardly toward the wheel, so as to form sockets substantially cylindrical, but open on the inner side, adapted to receive the shoulders D of the clamps C. Said sockets are closed at the bottom, as seen at $b'$ in Fig. 1, to form secure seats for said shoulders.

There are two clamps C for each brake, one upon each side of the wheel, each having the longitudinal and substantially-cylindrical shoulder D before mentioned, an inner wing $c$, and an outer wing $c'$. The shoulders D fit easily in the sockets of the clamp-holders, so as to have free rotation therein, so far as permitted by the longitudinal openings therein, which are narrow enough to prevent said shoulders from falling out of or being removed from the sockets, except by an upward longitudinal movement.

The inner wing $c$ of each of the clamps C is flat on its outer face toward the block A to conform to the inner face of the clamp-holder B, but is curved on its inner face to conform to the periphery of the tire. The wing portions $c'$ are practically straight longitudinally, so as to have a flat bearing against the edges of the tire. The space between the wings $c'$ of the two opposite clamps, when said clamps are in closed position, is less than the width of the tire, so that when said wings are forced together by the application of the brake they will have a firm bearing on the edges of the tire. The inner faces of the wings $c'$ flare outwardly from their points of intersection with wings $c$, so that in operation they will serve as guides to bring the brake into proper engagement with the wheel.

The operation has been substantially indicated. The clamps C when not in action assume the positions shown in Fig. 3 by the force of gravity, the brake-locks being preferably so located that the clamps will occupy normally a downwardly-inclined position, thus dispensing with the necessity for springs to hold the clamps open. When the brake is brought against the wheel, the face of the tire impinges against the inner wings $c$. The pressure causes the clamps to rotate on the shoulders D as pivots, and the wings $c'$ are forced inward against the edges of the tire. When the brake is released, the clamps fall again to open position, ready for the next application.

My brake is especially useful for heavy vehicles or on steep grades, the construction securing great power and efficiency.

Having described my invention, I claim as new and desire to secure by Letters Patent—

1. In a wagon or vehicle brake, a brake-block, a clamp-holder mounted on the inner face of the brake-block, provided upon each side with a curved extension forming a substantially-cylindrical socket, each of said sockets being closed at the bottom, and having a vertical opening on the side toward the wheel, in combination with rotatable clamps having inner wings adapted to engage the periphery of the tire, outer wings adapted to engage the edges of the tire, and integral longitudinal shoulders adapted to engage said sockets, substantially as set forth.

2. In a vehicle-brake, the combination with a brake-block, a clamp-holder mounted on the brake-block and provided with lateral extensions curved inwardly and forming substantially-cylindrical sockets, of a pair of clamps having integral longitudinal shoulders rotatably engaging said sockets, and each having inner and outer wings, to bear respectively against the periphery and edges of the tire, the inner wings having curved outer faces conforming to the curvature of the wheel, substantially as set forth.

In testimony whereof I affix my signature in the presence of two witnesses.

ALBERT LEWIS.

Witnesses:
B. BARKS,
F. A. SPENCER.